US011776392B2

(12) United States Patent
Runemalm et al.

(10) Patent No.: US 11,776,392 B2
(45) Date of Patent: Oct. 3, 2023

(54) METHOD FOR ASSIGNING EGO VEHICLE TO A LANE

(71) Applicant: Zenuity AB, Gothenburg (SE)

(72) Inventors: Viktor Runemalm, Gothenburg (SE); Markus Hammarsten, Gothenburg (SE); Jonatan Silvlin, Gothenburg (SE); Albin Manhof, Gothenburg (SE)

(73) Assignee: Zenuity AB, Gothenburg (SE)

( * ) Notice: Subject to any disclaimer, the term of this patent is extended or adjusted under 35 U.S.C. 154(b) by 798 days.

(21) Appl. No.: 16/600,719

(22) Filed: Oct. 14, 2019

(65) Prior Publication Data
US 2020/0118426 A1 Apr. 16, 2020

(30) Foreign Application Priority Data
Oct. 15, 2018 (EP) .................................... 18200390

(51) Int. Cl.
| G08G 1/01 | (2006.01) |
| G05D 1/02 | (2020.01) |
| G05D 1/00 | (2006.01) |
| G08G 1/16 | (2006.01) |

(52) U.S. Cl.
CPC ......... *G08G 1/0137* (2013.01); *G05D 1/0088* (2013.01); *G05D 1/0231* (2013.01); *G05D 1/0278* (2013.01); *G05D 2201/0213* (2013.01); *G08G 1/167* (2013.01)

(58) Field of Classification Search
CPC .... G08G 1/0137; G08G 1/167; G05D 1/0088; G05D 1/0231; G05D 1/0278; G05D 1/0221; G05D 2201/0213; G06K 9/00798; B60W 30/12

USPC ........................................................... 701/23
See application file for complete search history.

(56) References Cited

U.S. PATENT DOCUMENTS

| 5,311,173 | A  | * | 5/1994  | Komura ................. G01C 21/30 |
|           |    |   |         | 340/995.22 |
| 8,452,535 | B2 | * | 5/2013  | Zeng ...................... G01S 19/50 |
|           |    |   |         | 701/466 |
| 10,773,719 | B2 | * | 9/2020  | Heidenreich .......... G01C 21/30 |
| 10,824,162 | B2 | * | 11/2020 | Panzica ................ G05D 1/0212 |
| 10,928,207 | B2 | * | 2/2021  | Zhang ................... G05D 1/0274 |
| 11,125,566 | B2 | * | 9/2021  | Cui ...................... G06K 9/00671 |
| 2010/0324815 | A1 | * | 12/2010 | Hiruta ................... G01C 21/30 |
|           |    |   |         | 701/532 |
| 2016/0335507 | A1 |   | 11/2016 | Chen et al. |
| 2020/0240806 | A1 | * | 7/2020  | Daikoku ................. G08G 1/04 |

FOREIGN PATENT DOCUMENTS

| CN | 107221195 A | 9/2017 |
| DE | 102014003343 A1 * | 9/2014 ...... B60W 30/18163 |
| JP | 2019016246 A * | 1/2019 |

(Continued)

*Primary Examiner* — Cuong H Nguyen
(74) *Attorney, Agent, or Firm* — SAGE PATENT GROUP (57) ABSTRACT

The present invention relates to methods and arrangements for assigning a vehicle to a lane in a road for a vehicle. The proposed solution obtains an estimated pose for the vehicle, projects the pose to nearby lanes, obtains uncertainty values for the pose and lanes, creates a distribution by combining the pose and lane uncertainties, creates a momentary likelihood for the vehicle being in each lane, adjusts the momentary likelihoods with prior values obtained in a previous iteration, and determines the most likely lane.

16 Claims, 6 Drawing Sheets

(56) References Cited

FOREIGN PATENT DOCUMENTS

| KR | 1020170085752 A | 7/2017 | |
| WO | 2018/015811 A1 | 1/2018 | |
| WO | WO-2019073024 A1 * | 4/2019 | ......... G06K 9/00798 |

* cited by examiner

METHOD FOR ASSIGNING EGO VEHICLE TO A LANE

CROSS-REFERENCE TO RELATED APPLICATIONS

The present application for patent claims priority to European Patent Office Application Ser. No. 18200390.5, entitled "A method for assigning ego vehicle to a lane," filed Oct. 15, 2018, assigned to the assignee hereof, and expressly incorporated herein by reference.

The present invention relates to system, methods and arrangements for determining a position of a vehicle and in particular for a solution for determining in which lane the vehicle is in and assigning the vehicle to the lane.

BACKGROUND

The last years the development of technology for autonomous vehicles has exploded and many different solutions are being developed, both within sensor technologies and control solutions for controlling the vehicle and determining objects in the surrounding area as well as the location of the vehicle relative roads, other vehicles, objects and so on to ensure a safe travel of the vehicle. Today, development is ongoing in both autonomous driving (AD) and advanced driver-assistance systems (ADAS). There exists a number of different technical areas within this field. One such area is how to position the vehicle with accuracy and consistency since this is an essential safety feature for the vehicle when moving within traffic. Of fundamental importance to autonomous driving is an accurate model of the roadway and its lanes as the vehicle moves.

Satellite based positioning systems (Global Navigation Satellite Systems, GNSS), like for instance Global Positioning system (GPS), Globalnaya Navigazionnaya Sputnikovaya Sistema (GLONASS), Galileo, Beidou, and other regional systems are often not accurate enough to rely on solely for determining a position of a moving vehicle.

These GNSS based solutions have even less accuracy in determining height/horizontal information.

When utilizing maps to navigate and estimate adjacent lane geometry the ability to estimate current ego lane from an estimated position plays an important role. For instance if two roads are placed on top of each other and one is turning left while the other is turning right the ability to estimate the lane geometry is directly correlated to the ego lane assignment. Further it has been found that utilizing height information from GNSS is unstable—especially when going under another road where the reception of satellite signals are reduced—and does not provide the accuracy needed to separate the roads from each other.

Therefore, current solutions utilize a number of different sensors to increase the reliability of map position such as image processing, Lidar, vehicle travelling parameters such as speed, and so on. However, even when the position and the instantaneous direction of the vehicle is known the forward travel of the vehicle can still be difficult to predict or estimate, for instance in above example with overlapping roads or when different road segments are located close to each other. One such as example is for instance when the vehicle is approaching a highway exit or similar branching of the road.

Chinese patent document CN107221195 discusses an anti-collision solution for vehicle lane prediction and lane level map wherein a lane level is determined using a unique link ID number for each lane and including vehicle travel history into the algorithm for determining the current lane of the vehicle.

SUMMARY

It is an object to obviate at least some of the above disadvantages and provide improved node(s) and method(s) for assigning a vehicle to a lane in road.

This is provided in a number of embodiments, such as a method for assigning a vehicle to a lane in a road for a vehicle, wherein the method comprise obtaining an estimated pose, E, of the vehicle, obtaining an uncertainty value, V, to the estimated pose of the vehicle, projecting the pose, E, onto nearby lanes in a map, obtaining position uncertainty, U, of each lane, creating a distribution, P, by combining uncertainty V and U for each nearby lane, creating a current momentary likelihood hypothesis for the vehicle for being in each lane by evaluating distribution, P, with pose, E, for each projection, adjusting the current momentary likelihood for each lane with a prior likelihood determined earlier; and comparing all the adjusted momentary likelihoods and determining the lane with the highest likelihood.

In the method, the step of adjusting current momentary likelihoods may comprise, for each likelihood from a previous iteration: checking for a logical connection associated to a current momentary likelihood and adjusting the current momentary likelihood with the value of the likelihood from the previous iteration if the connection is within a set distance from the pose, E, and if the current momentary likelihood has not been adjusted previously; and adjusting current momentary likelihoods, that was not adjusted in previous step, with a minimum value.

The set distance may be set to shorter than 10 meters, or more preferably shorter than 5 meters, or even more preferably 2 meters or shorter.

Nearby lanes may be located within 20 meters from the estimated pose, or more preferably within 10 meters from the estimated pose, or even more preferably within 5 meters or shorter from the estimated pose.

The method may further comprise a step of normalizing the current likelihoods. The method may further comprise a step of setting all likelihoods below a threshold to a fixed minimum likelihood value. The step of normalizing the current likelihoods may comprise determining the maximum value of the most probably current likelihood and subtracting this maximum value from all current likelihoods.

The maximum of the likelihood value for each lane is found in respective lane centre and each lanes probabilistic value drops to zero at some distance away from the centre of the respective lane.

The step of adjusting momentary likelihood may comprise checking logical connection between lane hypotheses in the map. The pose may comprise a position in map coordinates and a direction of travel. Acquiring estimated pose of the vehicle may comprise acquiring sensor data from at least one of a Global Navigation Satellite System, camera, vehicle parameters, and Lidar.

The method is advantageously implemented in autonomous vehicles or advanced driver-assistance systems vehicles.

Another embodiment is provided in a vehicle control system comprising at least one processor, at least one memory for storing instructions and data, at least one sensor interface, and at least one communication interface. The processor is arranged to execute instruction sets stored in the memory to acquire data via the sensor interface and execute a method of obtaining an estimated pose, E, of the vehicle, obtaining an uncertainty value, V, to the estimated pose of the vehicle, projecting the pose, E, onto nearby lanes in a map, obtaining position uncertainty, U, of each lane, creating a distribution, P, by combining uncertainty V and U for each nearby lane, creating a current momentary likelihood hypothesis for the vehicle for being in each lane by evaluating distribution, P, with pose, E, for each projection, adjusting the current momentary likelihood for each lane with a prior likelihood determined earlier; comparing all the adjusted momentary likelihoods and determining the lane with the highest likelihood, and sending control parameters on the communication interface for controlling the vehicle in accordance with the determined most probable lane.

In the vehicle control system, the step of adjusting current momentary likelihoods may comprise, for each likelihood from a previous iteration: checking for a logical connection associated to a current momentary likelihood and adjusting the current momentary likelihood with the value of the likelihood from the previous iteration if the connection is within a set distance from the pose, E, and if the current momentary likelihood has not been adjusted previously; and adjusting current momentary likelihoods that was not adjusted in previous step, with a minimum value.

Yet another embodiment is provided, a vehicle comprising a vehicle control system, controlling driving functions of the vehicle, comprising at least one processor, at least one memory for storing instructions and data, at least one sensor input interface, at least one sensor for acquiring an estimation of vehicle position, wherein the vehicle control system is arranged to execute instructions in the processing unit for executing the above method.

Still another embodiment is provided, a computer program product arranged to execute the above method.

The proposed solution makes it possible to achieve an increased accuracy of determining in which lane a vehicle is in. With the proposed solution more accurate position data may be obtained also for situations with many lanes present at a local area as well as with lanes provided over each other.

This has the advantages of providing an efficient way of providing a high likelihood of the vehicle being in a lane and thus providing a possibility for the system to determining a suitable route forward knowing the destination. This may be done both on a short and long term perspective, i.e. an operational and strategic level.

BRIEF DESCRIPTION OF FIGURES

In the following the invention will be described in a non-limiting way and in more detail with reference to exemplary embodiments illustrated in the enclosed drawings, in which.

DETAILED DESCRIPTION

Figure 1:
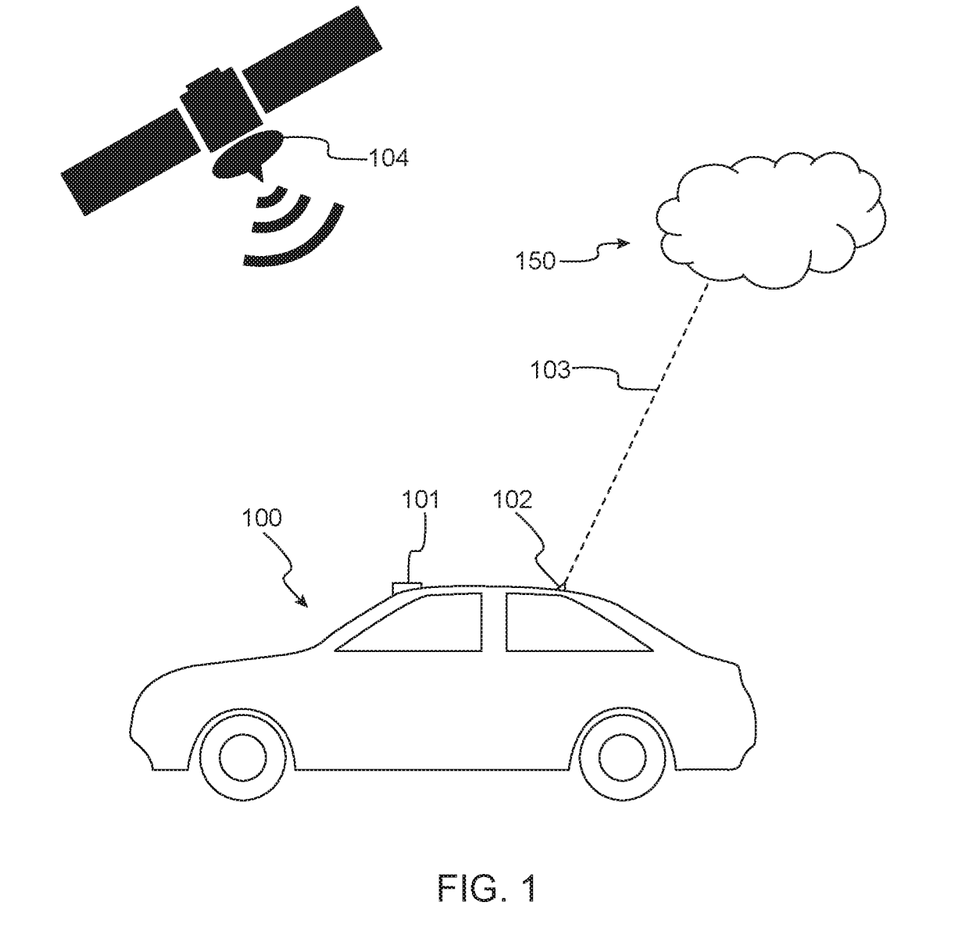
FIG. 1 is a schematic diagram illustrating an example vehicle.

In FIG. 1 reference numeral 100 generally denotes a vehicle, or sometimes denoted as ego-vehicle, that may be autonomous, manually driven or a combination of these, i.e. semi-autonomous. The vehicle 100 comprise any suitable parts for propulsion and controlling the vehicle such as an engine or electrical motor(s), control electronics for controlling and monitoring the engine/motor, propulsion, steering, gear box, breaks, lights, user interface dashboard, wheels and so on as understood by the skilled person. However, for autonomous or semi-autonomous driving the vehicle have electric control circuitry 210, as will be described in more detail in relation to FIG. 2, and one or more sensors 101, 102 for providing data such as related to position, speed, direction of travel, temperature, road surface characteristics, and so on. Position sensors may include sensors receiving signals from one or several satellite based positioning systems. e.g. from GPS satellites 104 via an antenna 102 and/or one or more cameras 101 providing images of the road and surrounding areas. These images may be processed to determine vehicle position relative road boundaries, other vehicles and so on. The vehicle may also be provided with an IMU (Inertial Measurement Unit) (not shown) comprising accelerometers and gyroscopes for assisting in tracking the vehicles position and movements. Other sensors that may be used are for instance Lidar (light detection and ranging) and radar for keeping track of distances and relative speed to other vehicles around the vehicle; these sensors have not been illustrated in FIG. 1 but may be housed within the vehicle or combined in sensor unit 101. The antenna may be used for both communication with external networks and also for receiving GPS signals; however, separate antennas may be provided for external communication and GPS signals.

The vehicle may further be connected to external network(s) 150 via for instance a wireless link 103. The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, V2V, and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

Figure 2:
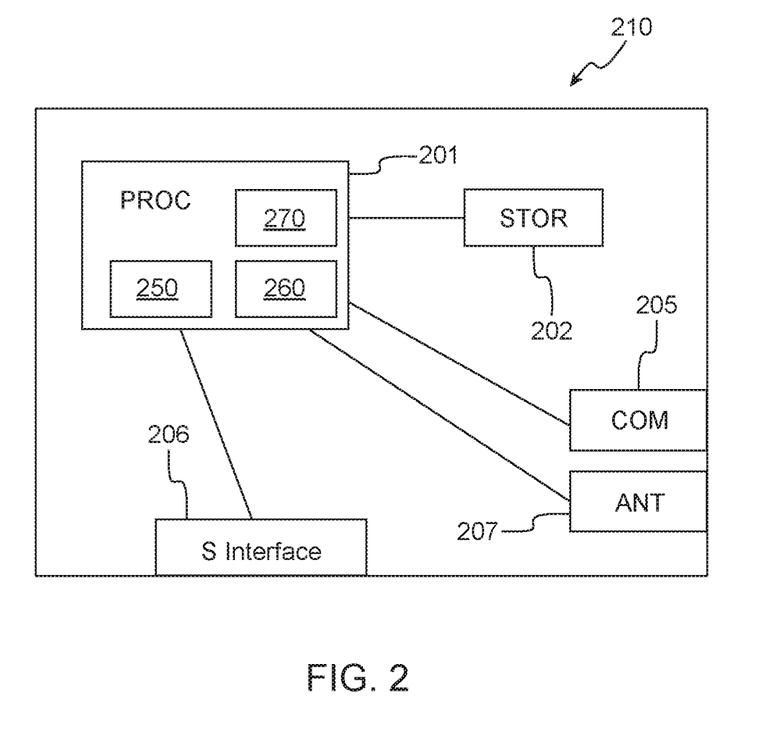
FIG. 2 is a schematic block diagram illustrating exemplary control circuitry.

A vehicle control circuitry/system 210 is used for controlling the vehicle and is illustrated in FIG. 2. Control circuitry may comprise at least one processor 201 with a number of modules 250, 260, and 270 for performing different operations, at least one computer readable memory or storage medium 202 for storing data and/or instruction sets for operating different functions in the processor. Furthermore, optionally, depending on functionality provided in the control circuitry one or more communication interfaces 205 and/or one or more antenna interfaces 207 may be provided and furthermore, also one or more sensor interfaces 206 may be provided for acquiring data from sensors within the vehicle. The modules of the processor may be a creation module 250, an adjustment module 260 and a comparing module 270 each arranged to execute instruction sets for different steps of a process for determining the ego-lane of a vehicle. It should be appreciated that the communication/antenna interface may also provide the possibility to acquire sensor data directly or via dedicated sensor control circuitry in the vehicle: for instance GPS data may be acquired through the antenna interface, some sensors in the vehicle may communicate with the control circuitry using a local network setup, such as CAN bus, I2C, Ethernet, optical fibres, and so on. The communication interface may be arranged to communicate with other control functions of the vehicle and may thus be seen as control interface also; however, it separate control interface (not shown) may be provided. Local communication within the vehicle may also be of a wireless type with protocols such as WiFi, LoRa, Zigbee, Bluetooth, or similar mid/short range technologies.

The processor 201 may for instance be a microprocessor, digital signal processor, graphical processing unit (GPU), embedded processor, field programmable gate array (FPGA), or ASIC (Application specific integrated circuit). The storage unit 202 may be a volatile or non-volatile computer readable memory and arranged to store instructions or instruction sets for execution by the processor. Instruction sets are preferably stored in a non-volatile memory such as solid state (SSD), magnetic disk drive storage, optical storage such as CD, DVD, or Bluray, or persistent solid state memory technology such as flash memory or memory card. The storage unit may also comprise a combination of storage types. The method may be realized in a computer program product and/or stored in a computer-readable storage medium. The memory may be non-transitory or transitory computer-readable storage medium which stores one or more programs configured to be executed by one or more processors of an electronic device with or without a display apparatus and one or more input devices. The computer program product may be delivered on a storage medium such as for instance SSD, magnetic storage, optical storage or delivered on a network connection as a signal with a suitable protocol, for instance Ethernet using Internet Protocol (IP) or wirelessly with suitable radio protocol such as cellular technologies or short or medium range local area network technologies.

Figure 3:
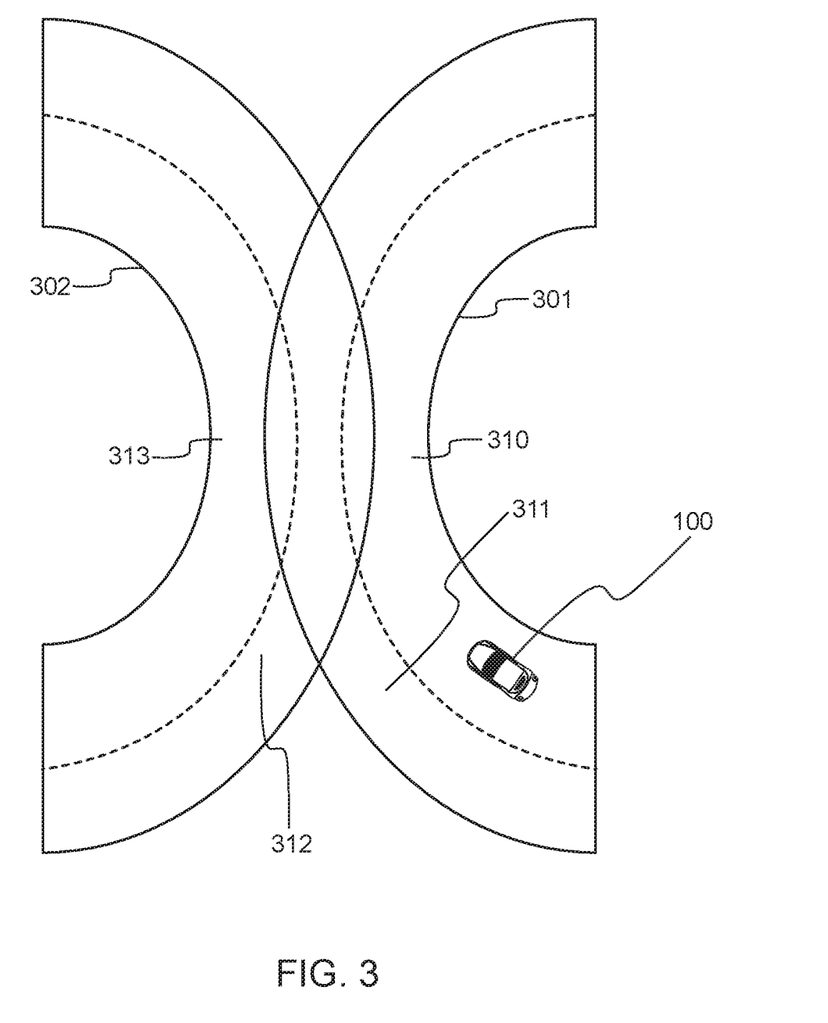
FIG. 3 is a schematic diagram illustrating an exemplary lane situation.

FIG. 3 illustrates an exemplary lane situation where two roads 301, 302 are close to each other or overlap partially or entirely. Each road in this case comprise two lanes each 310, 311, 312, 313 and the vehicle 100 is travelling on one lane 310. At some point when the vehicle is travelling along a lane 310 it will be close to other lanes for instance lane 312 and the control circuitry of vehicle 100 need to determine where the vehicle is travelling and on which lane it is at a specific time. Due to uncertainties in determination of location, speed, and yaw of the vehicle, and map accuracy there is only a finite accuracy of the necessary parameters to determine the location/pose of the vehicle in such a way as to safely control the vehicle when in autonomous or semi-autonomous driving mode. Determination of the location of the vehicle has built in uncertainties, for instance due to noise in the GPS signal, accuracy of speed measurement, accuracy of yaw measurement, camera resolution, latency issues in processing, map accuracy, and so on. In one embodiment parameters related to vehicle pose is used, i.e. pose comprise a two dimensional position on a map and a direction of travel. The two dimensions on the map are surface coordinates excluding the height information. However, it should be appreciated that the location data may comprise height information as well which could be used in below analysis in determining where the vehicle is in relation to available lanes/roads.

Radar and Lidar signals may also be used for determining the position of the vehicle. For instance with the use of Radar and/or Lidar maps of static objects such as signs, barriers, houses and so on. Also known landmarks may be used to position the vehicle on a map; images of the surrounding area may be analysed to identify objects and landmarks which may be compared to known objects and landmarks.

Figure 4:
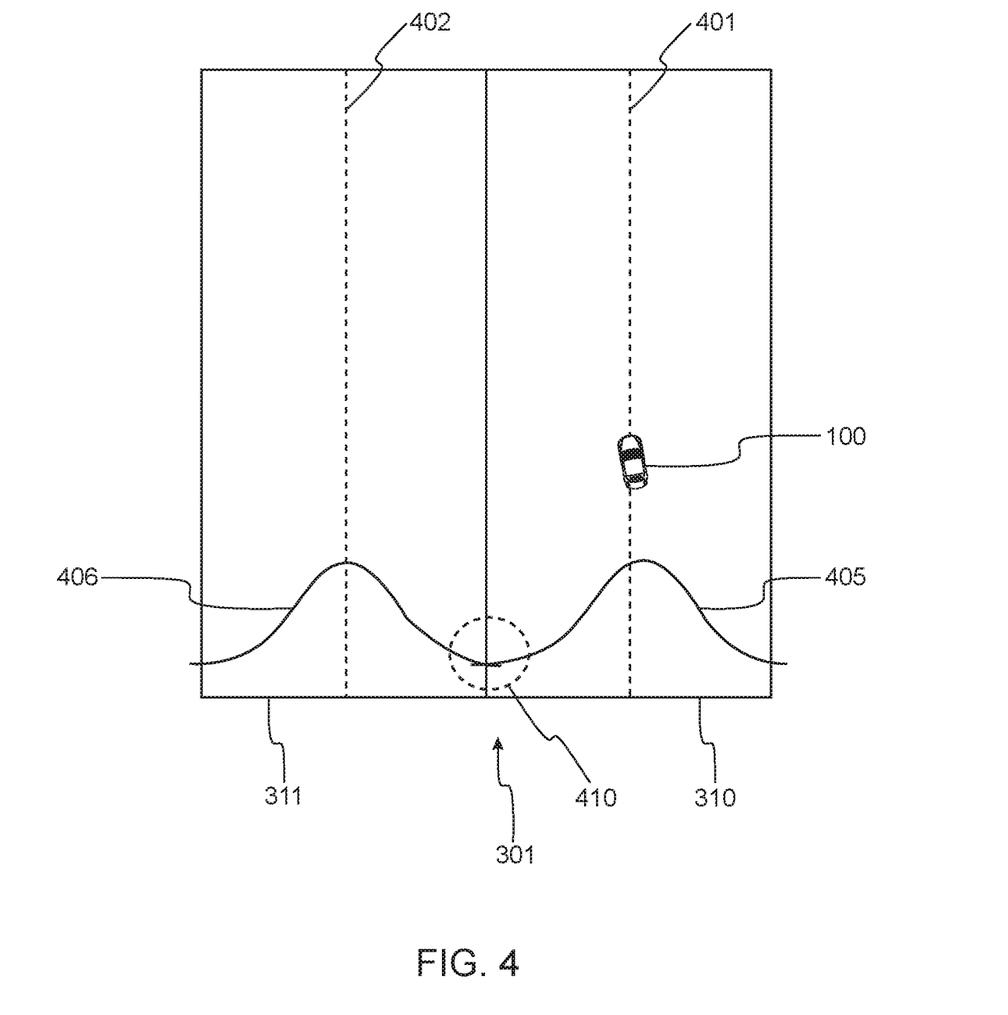
FIG. 4 is a schematic diagram illustrating an exemplary likelihood distribution.

In FIG. 4, an example of uncertainty, U, 405, 406 of each lane 310, 311 position is plotted, in this case this may for instance be a Gaussian distribution, as seen in FIG. 4, with centre on lane centre 402, 401 of the road 301 and then with decreasing likelihood towards the lane sides; however, other statistical distributions may be used to describe the uncertainties of the lane position. In a similar manner the different uncertainties of the parameters may be determined or estimated. It can be noted in FIG. 4 that the statistical distributions overlap 410 and thus there is some probability that the vehicle is in another lane as compared to the centre position of the distribution. The lane uncertainty, U, may depend on map uncertainties, lane size and so on. For instance in some areas the map is more reliable than in other areas due to having been more thoroughly investigated, e.g. using a plurality of vehicles to map out these areas; this may for instance be the case for high traffic areas close to cities or other densely populated areas. Some maps are built upon feedback from vehicles travelling in the area.

Figure 5:
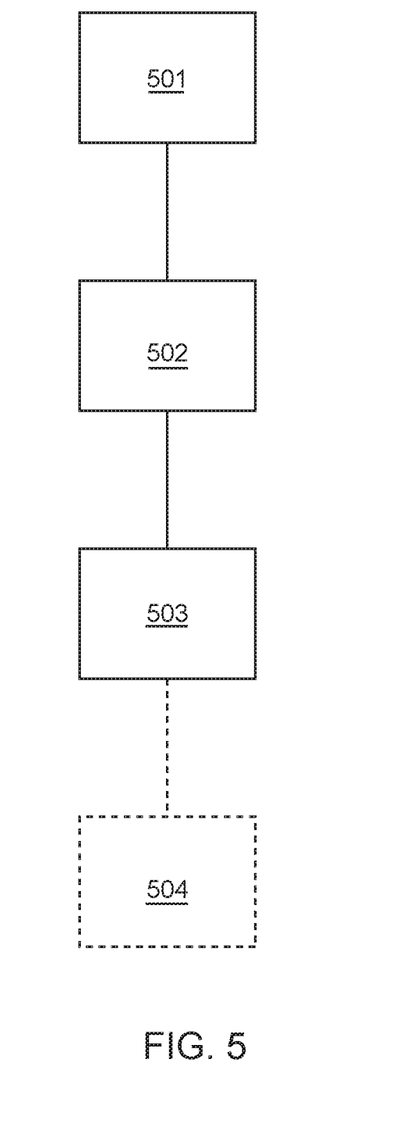
FIG. 5 is a schematic block diagram illustrating an exemplary method.

The processor in the processing system is arranged to iteratively execute instruction sets stored in the memory for acquiring sensor data via the sensors interface and operating a method for assigning a vehicle to a lane by determining the most likely lane in which the vehicle is located, the so called ego-lane. This may be done by first creating 501 a momentary assignment-likelihood for each nearby lane within a predetermined distance from an estimated pose of the vehicle, adjusting 502 the momentary likelihood for each lane with a prior, which prior is determined from a previous iteration, comparing 503 all the adjusted momentary likelihoods and determining the most probable lane. The predetermined distance may be set to for instance 5 meters, 10 meters, or 20 meters, but it should be understood that other distances may be used including shorter or longer distances. Roads or road sections that have a logical connection with where the vehicle was in a previous iteration will be used in the creation of likelihood values. Optionally, the processor may be arranged to send 504 control parameters on the communication/control interface for controlling the vehicle in accordance with the determined geometry of the most probable lane. This process is iterated often enough to ensure safe determination of in which lane the vehicle is in, for instance with a frequency of 1-200 times per second depending on speed of vehicle and computational power.

Figure 6:
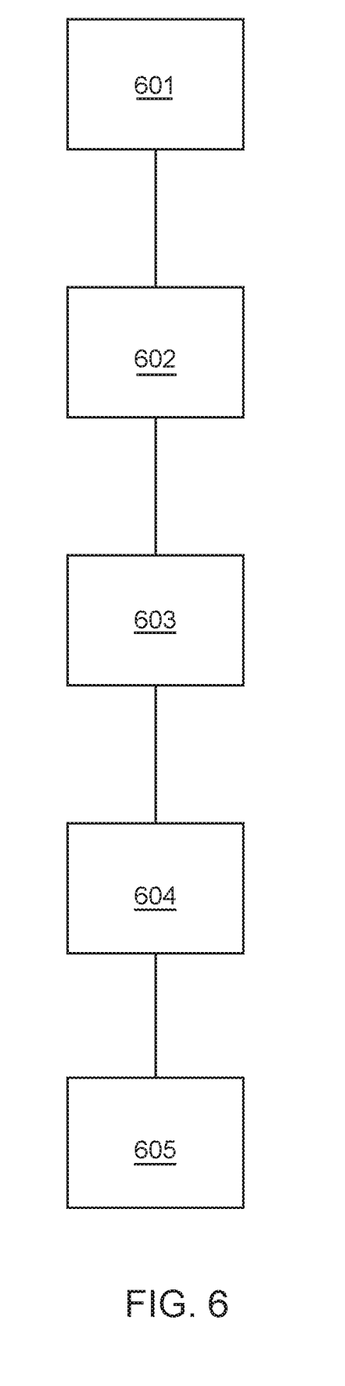
FIG. 6 is a schematic block diagram illustrating an exemplary method.

The step of creating the momentary-likelihoods for the current iteration may comprise acquiring 601 the estimated pose, E, of the vehicle, i.e. the position on a map, with or without height information, and with direction of travel. The estimated pose may be obtained by using the sensor data such as data from a global navigation satellite system and/or based on determination of fixed landmarks using other sensors. The estimated pose may be expressed in either a global coordinate frame or a local map-based coordinate frame.

Furthermore, the method comprise determining 602 an uncertainty value, V, to the estimated pose of the vehicle. The pose uncertainty may be expressed for instance as a Gaussian around a most likely pose. The uncertainty V is depending for instance on sensors signals, map uncertainty, update frequency of sensor, update frequency of iteration of algorithms, and speed of vehicle. V may be either a set static value or a dynamic value determined for each iteration or at some intervals.

E is projected 603 onto nearby lanes in a map, for instance by finding the closest point from E to nearby lanes. The projection for each lane advantageously also comprise the lane direction. Creating 604 a distribution, P, by combining uncertainty of V with uncertainty of lane, U, for each lane. Uncertainty of lane may be expressed as a Gaussian and the uncertainty of lane may be a static value or a dynamic value depending on the map source and other factors. The step of creating the distribution, P, may be performed by combining the two Gaussians for V and lane. Depending on in which coordinate system and/or if working in decimal/logarithmic systems this combining of lane and pose uncertainties may be done in different ways for example by simply adding the two gaussians to each other. The method further comprises creating a momentary likelihood hypothesis for the vehicle being in each lane by evaluating 605 distribution P with pose E and creating a momentary likelihood hypothesis for the vehicle for being in each lane. The evaluation may be performed by subtracting E from each projection, P, and storing the results in a list.

In general, this momentary likelihood for each lane is adjusted with a prior value determined from a previous iteration, for example if it was determined that the vehicle was assigned to a lane in the last iteration then that prior value have a high value but if the lane was not occupied previously the prior will be low.

For example, the system steps through all likelihoods from the last iteration and for each likelihood from the previous iteration (prior), the system determines all logical connections to the current prior likelihood in the step, i.e. the current likelihood in the list of likelihoods from the last iteration. Each logical connection associated to a momentary likelihood are adjusted with the current prior likelihood if the connection is within a set distance to the pose of the vehicle and no prior likelihood has been assigned before to the logical connection. This set distance may be for instance 2 meter, 5 meters, or 10 meters. It should be understood that the set distance is not limited to the exemplified distances it may be larger or smaller. Adjusting all momentary likelihoods which were not adjusted above, with a minimum likelihood value. A connection is deemed logical if there is a connection on the map between lanes.

All lanes with a logical connection or within a certain distance from the last occupied lane will get a non-zero value to indicate that there is some likelihood for the vehicle to be in that lane; however, for many of the lanes the likelihood is very small. By comparing all the adjusted momentary likelihoods it is possible to determine the most probable lane where the vehicle is, i.e. determining the lane with the highest adjusted likelihood or probability.

By comparing the adjusted likelihoods, the most likely lane may be found and the vehicle may be assigned to that lane.

Before using the likelihood values in next iteration all non-zero values are preferably normalized, for instance so that all the non-zero values add up to a reference value, such as 1, 100%, or any other suitable value used in statistical analysis to determine the overall probability. Another way of normalizing the likelihood values is to for each likelihood subtract the maximum likelihood in the created likelihoods, i.e. normalized likelihoods equals non-normalized likelihood subtracted by maximum value of non-normalized likelihoods if operating in a log scale. This normalized probability value for each lane is set as prior for that lane in next iteration. For likelihoods below a threshold, the likelihood value is set to a minimum likelihood value. For possible lanes with no prior value a prior for that lane is set to a small non-zero value, for instance −12 using a log scale in the calculations. It should be understood that the normalization step may be done before the comparison step.

The method in one embodiment may be described in a short step-by-step example:

1) Find the closest point (projection) from "E" onto all nearby lanes, and form the set "projection_set" which contains all projections. Each projection also contains information of the lane direction (lane heading).
2) Create distribution "P" from uncertainty "V" for "E" together with lane uncertainty (for example by using Gaussian distributions).
3) Create momentary likelihood for each projection by evaluating ((projection—"E") for each projection in projection_set) in "P".
4) For each likelihood from the previous iteration (prior), starting with the highest and working downwards, do the following:
   Find all logical connections from current prior "CP"
   For each logical connection, including the prior, associated to a momentary likelihood: Adjust the momentary likelihoods with the "CP" likelihood if the connection is physically close to "E", and if no prior has been added.
5) Use a minimum likelihood value to adjust all momentary likelihoods which were not adjusted in the step 4).
6) Normalize all likelihoods (likelihoods—max of (likelihoods)) and set all likelihood values lower than a threshold to a minimum likelihood value.
7) Sort list with respect to likelihood and extract the most probable lane.
8) Go to 1)

However, it should be understood that the order of some of the steps may be interchanged, for example step 7 and 6 may be performed in different temporal order.

This approach is in line with Bayesian probability theory operating with probability distributions.

Sensor and/or determined data may be low and/or high pass filtered in any suitable way in order to reduce fluctuations and spurious data and provide a smoother data set for controlling the vehicle.

Also the analysis may be used to determine the suitable direction of travel of the vehicle by predicting and determining a suitable path forward knowing the current lane and destination. This may be used for determining a suitable route both on short and long term basis, i.e. operational and tactical respectively. One such parameter to plan for is fuel/energy consumption.

To summarize: given a map with the attributes: logical connections between lanes, a geometric description of the centre line, and a position of the ego-vehicle relative to the map, a probabilistic ego-lane assignment may be calculated. Firstly, compute projections to all lanes in the vicinity of the ego-vehicle. Based on the uncertainty of the ego-vehicle pose and the road, evaluate the distribution and assign a likelihood to all lanes to which a projection may be made. Secondly, utilize the prior history of lanes and update the likelihood of the lanes which have a prior. All new lanes which can be reached from any of the prior lanes, given the logical connections of the map, update their probability with the most likely prior from which the lane can be reached. These two steps are then repeated iteratively continuously updating the position of the vehicle relative the roads/lanes.

The distribution for evaluating the projections is at least a 3-dimensional distribution, which incorporates the surface position (x, y) on a map and the heading (orientation/yaw), i.e. the direction of travel.

With this solution the height information of the lanes is not needed to determine the most probably lane for which the vehicle is occupying reducing the uncertainty of the position and/or pose and increasing the safety.

It should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the steps to determine the most probable lane and send back information indicating the lane and other relevant parameters used in controlling the vehicle.

ABBREVIATIONS

Wi-Fi Wireless Fidelity (registered trademark of Wi-Fi alliance)—based on IEEE 802.11 protocol
LoRa Long Range radio (registered trademark of LoRa alliance)
Zigbee Wireless communication protocol for IoT and similar applications, handled by the Zigbee Alliance.
GSM Global System for Mobile
GPRS General Packet Radio Service
EDGE Enhanced Data rates for Global Evolution
LTE Long term evolution
IP Internet Protocol
Radar Radio detection and ranging
Lidar Light detection and ranging

What is claimed is:

1. A method, performed by a processor of a vehicle control system, for assigning a vehicle to a lane in a road, wherein the method comprises:
obtaining an estimated pose, E, of the vehicle;
obtaining an uncertainty value, V, to the estimated pose of the vehicle, the uncertainty value, V, being indicative of a precision of the estimated pose, E;
projecting the estimated pose, E, onto nearby lanes in a map;
obtaining a position uncertainty value, U, of a position of each nearby lane;
creating a probability distribution, P, by combining uncertainty values V and U for each nearby lane;
creating a current momentary probability hypothesis for the vehicle for being in each lane by evaluating the probability distribution, P, with the estimated pose, E, for each projected pose;
adjusting the current momentary probability hypothesis for the vehicle being in each lane with a prior probability determined in an earlier iteration; and
comparing all the adjusted momentary probabilities;
determining the lane with the highest probability; and
controlling the vehicle based on determining the lane with the highest probability.

2. The method according to claim 1, wherein the step of adjusting current momentary probabilities comprise, for each probability from a previous iteration:
checking for a logical connection associated to a current momentary probability and adjusting the current momentary probability with the value of the probability from the previous iteration if the connection is within a set distance from the estimated pose, E, and if the current momentary probability has not been adjusted previously; and
adjusting current momentary probabilities that were not adjusted in the previous step with a minimum value.

3. The method according to claim 2, wherein the set distance is set to shorter than 10 meters.

4. The method according to claim 1, wherein nearby lanes are located within 20 meters from the estimated pose.

5. The method according to claim 2, further comprising a step of normalizing the current momentary probabilities.

6. The method according to claim 5, further comprising a step of setting all probabilities below a threshold to a fixed minimum probability value.

7. The method according to claim 5, wherein the step of normalizing the current probabilities comprise determining the maximum value of the most probable current likelihood and subtracting this maximum value from all current probabilities.

8. The method according to claim 1, wherein a maximum of the probability value for each lane is found in respective lane centre and each lanes probabilistic value drops to zero at some distance away from the centre of the respective lane.

9. The method according to claim 2, wherein the step of adjusting momentary probability comprise checking logical connection between lane hypotheses in the map.

10. The method according to claim 1, wherein the pose comprise a position in map coordinates and a direction of travel.

11. The method according to claim 1, wherein acquiring estimated pose of the vehicle comprise acquiring sensor data from at least one of a Global Navigation Satellite System, camera, vehicle parameters, and Lidar.

12. The method according to claim 1, wherein the vehicle is an autonomous vehicle or an advanced driver-assistance systems vehicle.

13. A vehicle control system comprising at least one processor, at least one memory for storing instructions and data, at least one sensor interface, and at least one communication interface, wherein the processor is arranged to execute instruction sets stored in the memory, acquire data via the sensor interface and:
- obtaining an estimated pose, E, of the vehicle;
- obtaining an uncertainty value, V, to the estimated pose of the vehicle, the uncertainty value, V, being indicative of a precision of the estimated pose, E;
- projecting the estimated pose, E, onto nearby lanes in a map;
- obtaining a position uncertainty value, U, of a position of each nearby lane;
- creating a probability distribution, P, by combining uncertainty values V and U for each nearby lane;
- creating a current momentary probability hypothesis for the vehicle for being in each lane by evaluating the probability distribution, P, with the estimated pose, E, for each projected pose;
- adjusting the current momentary probability hypothesis for the vehicle being in each lane with a prior probability determined in an earlier iteration;
- comparing all the adjusted momentary probabilities;
- determining the lane with the highest probability; and
- sending control parameters on the communication interface for controlling the vehicle in accordance with the determined most probable lane.

14. The vehicle control system according to claim 13, wherein the step of adjusting the current momentary probabilities comprise, for each probability from a previous iteration:
- checking for a logical connection associated to a current momentary probability and adjusting the current momentary probability with the value of the probability from the previous iteration if the connection is within a set distance from the pose, E, and if the current momentary probability has not been adjusted previously; and
- adjusting current momentary probabilities that were not adjusted in the previous step with a minimum value.

15. A vehicle comprising:
- a vehicle control system, controlling driving functions of the vehicle, comprising at least one processor, at least one memory for storing instructions and data, at least one sensor input interface;
- at least one sensor for acquiring an estimation of vehicle position,
- wherein the vehicle control system is arranged to execute instructions in the processor, the processor is configured to:
- obtain an estimated pose, E, of the vehicle;
- obtain an uncertainty value, V, to the estimated pose of the vehicle, the uncertainty value, V, being indicative of a precision of the estimated pose, E;
- project the estimated pose, E, onto nearby lanes in a map;
- obtain a position uncertainty value, U, of a position of each nearby lane;
- create a probability distribution, P, by combining uncertainty values V and U for each nearby lane;
- create a current momentary probability hypothesis for the vehicle for being in each lane by evaluating the probability distribution, P, with the estimated pose, E, for each projected pose;
- adjust the current momentary probability hypothesis for the vehicle being in each lane with a prior probability determined in an earlier iteration; and
- compare all the adjusted momentary probabilities;
- determine the lane with the highest probability; and
- control, via a processor, the vehicle based on determining the lane with the highest probability.

16. A non-transitory computer-readable storage medium storing one or more programs configured to be executed by one or more processors of a vehicle control system, the one or more programs comprising instructions for performing the method according to claim 1.

* * * * *